United States Patent [19]
Wang

[11] Patent Number: 5,743,499
[45] Date of Patent: Apr. 28, 1998

[54] ARM SUPPORT FOR COMPUTER OPERATOR

[76] Inventor: Te-Ming Wang, Fl. 1, No. 25, Ln 154, Shin Yi Rd., Pei Tou, Taipei, Taiwan, 112

[21] Appl. No.: 779,434

[22] Filed: Jan. 7, 1997

[51] Int. Cl.[6] .............................. B68G 5/00; B43L 15/00
[52] U.S. Cl. ...................... 248/118; 248/118.3; 248/918
[58] Field of Search .................... 248/718, 118.1, 248/118.3, 231.71, 279.1, 281.11, 278.1, 284.1, 287.1, 282.1, 285.1, 298.1, 918

[56] References Cited

U.S. PATENT DOCUMENTS

| | | | |
|---|---|---|---|
| 3,124,328 | 3/1964 | Kortsch | 248/118 |
| 3,944,178 | 3/1976 | Greenwood | 248/231.61 |
| 4,844,388 | 7/1989 | Kuba et al. | 248/282.1 |
| 4,997,054 | 3/1991 | Denny et al. | 248/118 |
| 5,074,501 | 12/1991 | Hölttä | 248/118.3 |
| 5,104,073 | 4/1992 | Van Beek et al. | 248/918 |
| 5,385,322 | 1/1995 | Kim et al. | 248/118 |
| 5,405,109 | 4/1995 | Nordnes | 248/279.1 |

*Primary Examiner*—Ramon O. Ramirez
*Assistant Examiner*—Anita M. King
*Attorney, Agent, or Firm*—Morton J. Rosenberg; David I. Klein; Jun Y. Lee

[57] ABSTRACT

An arm support adapted to support an arm of a user in a suspended manner is disclosed. The arm support includes an anchoring member adapted to be mounted to for example a desk, a swivelling member comprising an elongated member having a proximal end pivoted to the anchoring member and an opposite distal end defining a stop and a sliding member comprising a slider mounted on the elongated member to be movable along the elongated member between the anchoring member to which the proximal end of the elongated member is pivoted and the stop defined by the distal end of the elongated member and an arm rest rotatably mounted to the slider, defining a concave top face for supporting the arm of the user therein.

8 Claims, 5 Drawing Sheets

ARM SUPPORT FOR COMPUTER OPERATOR

FIELD OF THE INVENTION

The present invention relates generally to an arm support for supporting a person's arm and in particular to support the arm of a computer operator in operating the computer.

BACKGROUND OF THE INVENTION

Computers, such as personal computers, have been widely used in a modern office. The most common input device of the computer is the keyboard and the computer mouse. Both the keyboard and the mouse need to be operated by hands of a computer operator. In operating these peripheral devices, very often, the operator has to have his or her arm suspended from the desk. This causes strains on the muscle of the arm and thus eventually damages the operator's arms.

It is thus desirable to have an arm support to support the computer operators' arms so as to protect the arms from damage. However, the arm support should be carefully designed so as not to interfere with the movement of the operators's arms in operating the computer.

SUMMARY OF THE INVENTION

It is therefore a primary object of the present invention to provide an arm support to support a computer operator's arm in operating a computer for the protection of the computer operator's arm.

It is another object of the present invention to provide an arm support to support a computer operator's arm in such a manner not to interfere with the movement of the computer operator's arm in operating the computer.

A further object of the present invention is to provide an arm support for the computer operator's arm which may be stowed in a very limited space.

In accordance with the present invention, to achieve the above objects, there is provided an arm support for computer operator, comprising an anchoring member adapted to be mounted to for example a desk, a swivelling member comprising an elongated member having a proximal end pivoted to the anchoring member and an opposite distal end defining a stop and a sliding member comprising a slider mounted on the elongated member to be movable along the elongated member between the anchoring member to which the proximal end of the elongated member is pivoted and the stop defined by the distal end of the elongated member and an arm rest rotatably mounted to the slider, defining a concave top face for supporting the arm of the user therein.

The features and advantages of the present invention will be readily understood from the following description of a preferred embodiment, reference being had to the attached drawings, wherein:

DETAILED DESCRIPTION OF THE PREFERRED EMBODIMENT

Figure 1:
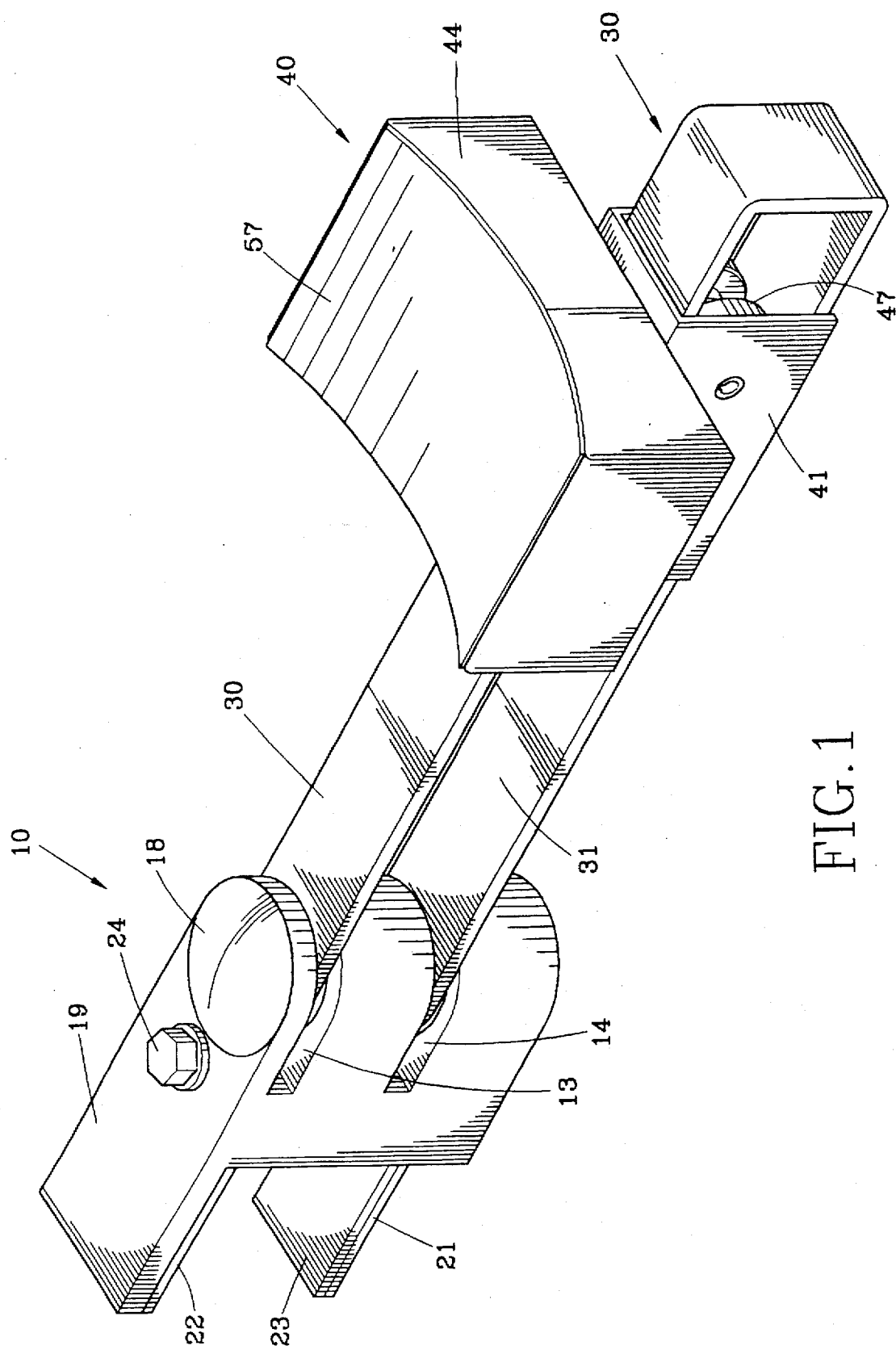
FIG. 1 is a perspective view showing an arm support constructed in accordance with the present invention.

With reference to the drawings and in particular to FIG. 1, wherein an arm support constructed in accordance with the present invention is shown, the arm support of the present invention comprises an anchoring member 10 for removably mounting to for example a desk (see FIG. 4), an elongated swivelling member 30 having one longitudinal end pivoted to the anchoring member 10 and extending therefrom to define a cantilever like configuration and a sliding member 40 slidably mounted on the swivelling member 30 to be movable along the length of the swivelling member 30.

The arm support of the present invention further comprises an arm rest 44 rotatably mounted to the sliding member 40 for supporting an arm of a computer operator (not shown) thereon.

Figure 2:
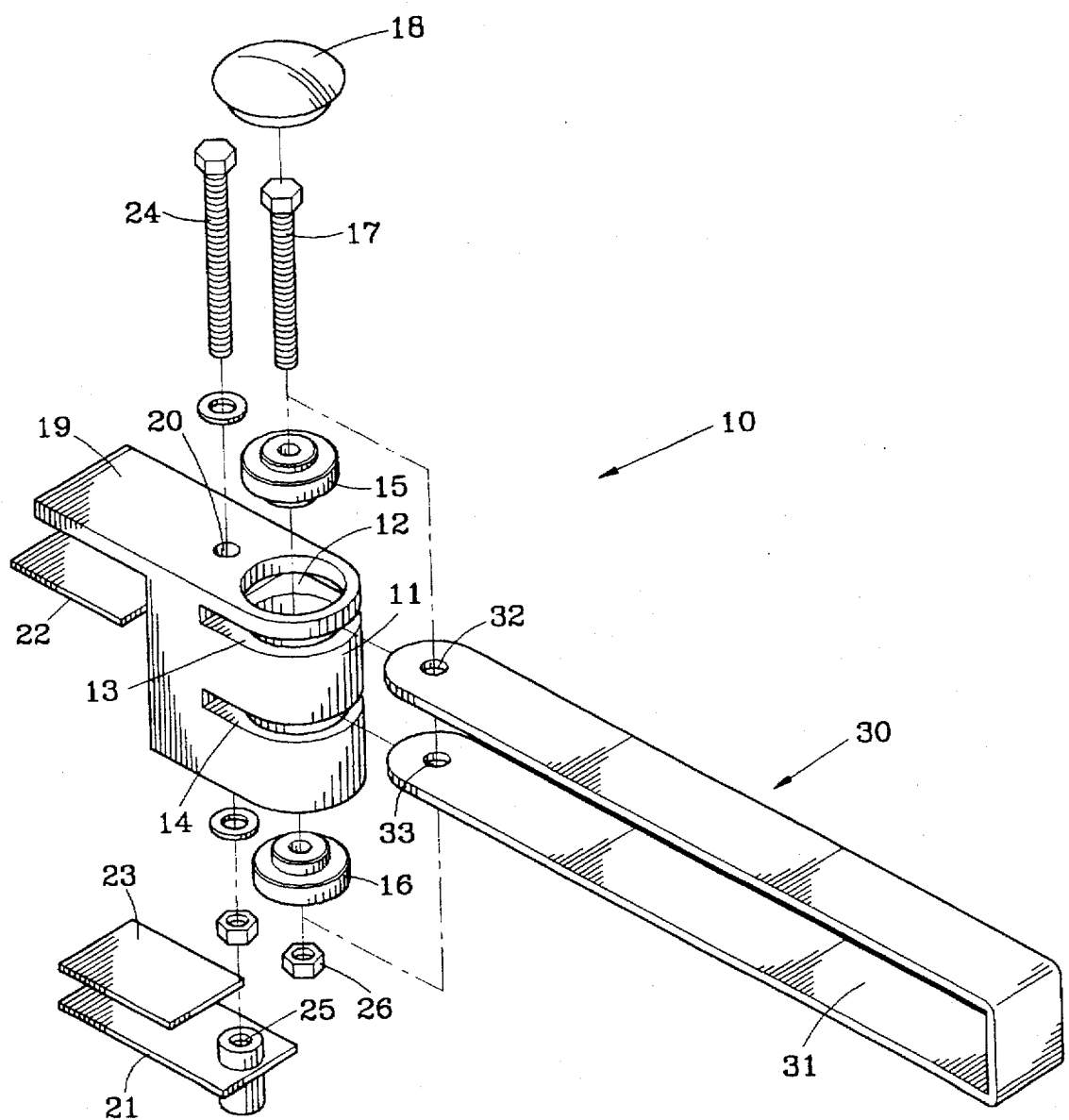
FIG. 2 is an exploded perspective view showing the pivotal connection between the anchoring member and the swivelling member adapted in the arm support of the present invention.

With particular reference to FIG. 2, the anchoring member 10 comprises a body 11 having a bore 12 extending therethrough to receive a pivot axle 17 therein to couple the swivelling member 30. This will be further described.

The anchoring body 11 comprises a sideways flange plate 19 extending sideways therefrom and a counterpart clip plate 21 which is arranged opposite to and distant from the flange plate 19 and movable relative to the flange plate 19 to adjust the distance therebetween. The clip plate 21 has an inner-threaded hole 25 provided on an inner end thereof which is movably disposed within a channel 27 (see FIG. 4) which is substantially parallel with the bore 12.

The channel 27 serves to guide the movement of the clip plate 21 relative to the flange plate 19. The anchoring body 11 comprises a bolt hole 20 through which a bolt 24 extends to engage the inner-threaded hole 25 of the clip plate 21. By rotating the bolt 24, the clip plate 21 is moved within the channel 27 relative to the flange plate 19 by means of the threading engagement between the bolt 24 and the inner-threaded hole 25 of the clip plate 21.

Figure 4:
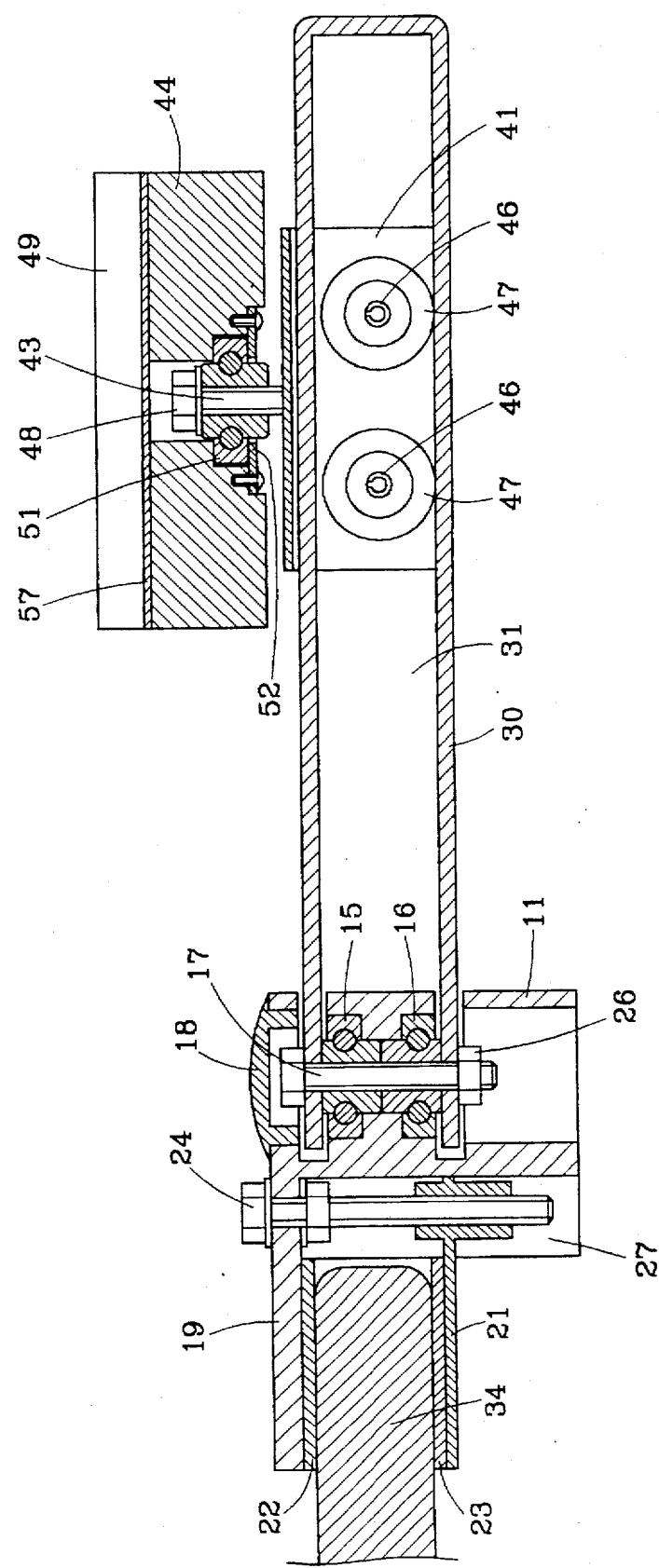
FIG. 4 is a longitudinal sectional view taken along the length of the swivelling member.

The relative movement of the clip plate 21 with respect to the flange plate 19 allows a user to adjust the distance therebetween so as to securely fix the anchoring member 10 to for example a desk 34, see FIG. 4, by clipping the desk 34 between the clip plate 21 and the flange plate 19.

Preferably, an anti-slippery pad 22 or 23 is provided between the interface between the desk 34 and each of the flange plate 19 and the clip plate 21 so as to more securely fix the anchoring member 11 to the desk 34.

The elongated swivelling member 30 comprises two spaced elongated strips defining therebetween a spacing 31. The two strips are connected to each other at a distal end in the longitudinal direction to define a stop and open at a proximal end. At the open proximal end of the swivelling member 30, each of the strips comprises a hole 32 and 33, substantially in alignment with each other. Corresponding to the proximal ends of the two strips of the swivelling member 30, the anchoring body 11 of the anchoring member 10 is provided with two lateral slits 13 and 14 formed thereon to be in communication with the bore 12 for receiving the proximal ends of the strips in such a manner that the holes 32 and 33 are substantially centered in the bore 12 to receive the pivotal axle 17 to extend therethrough. This pivots the swivelling member 30 to the anchoring member 10.

Two bearings 15 and 16 are received within the bore 12, each corresponding to one of the strips of the swivelling member 30. Preferably, the pivot axle 17 comprises a bolt engaged by a nut 26 so as to secure the strips of the swivelling member 30 to the bearings 15 and 16 to provide a more smooth rotation of the swivelling member 30 relative to the anchoring member 10.

A lid member 18 may be provided to seal the top opening of the bore 12 for aesthetic purpose.

Figure 3:
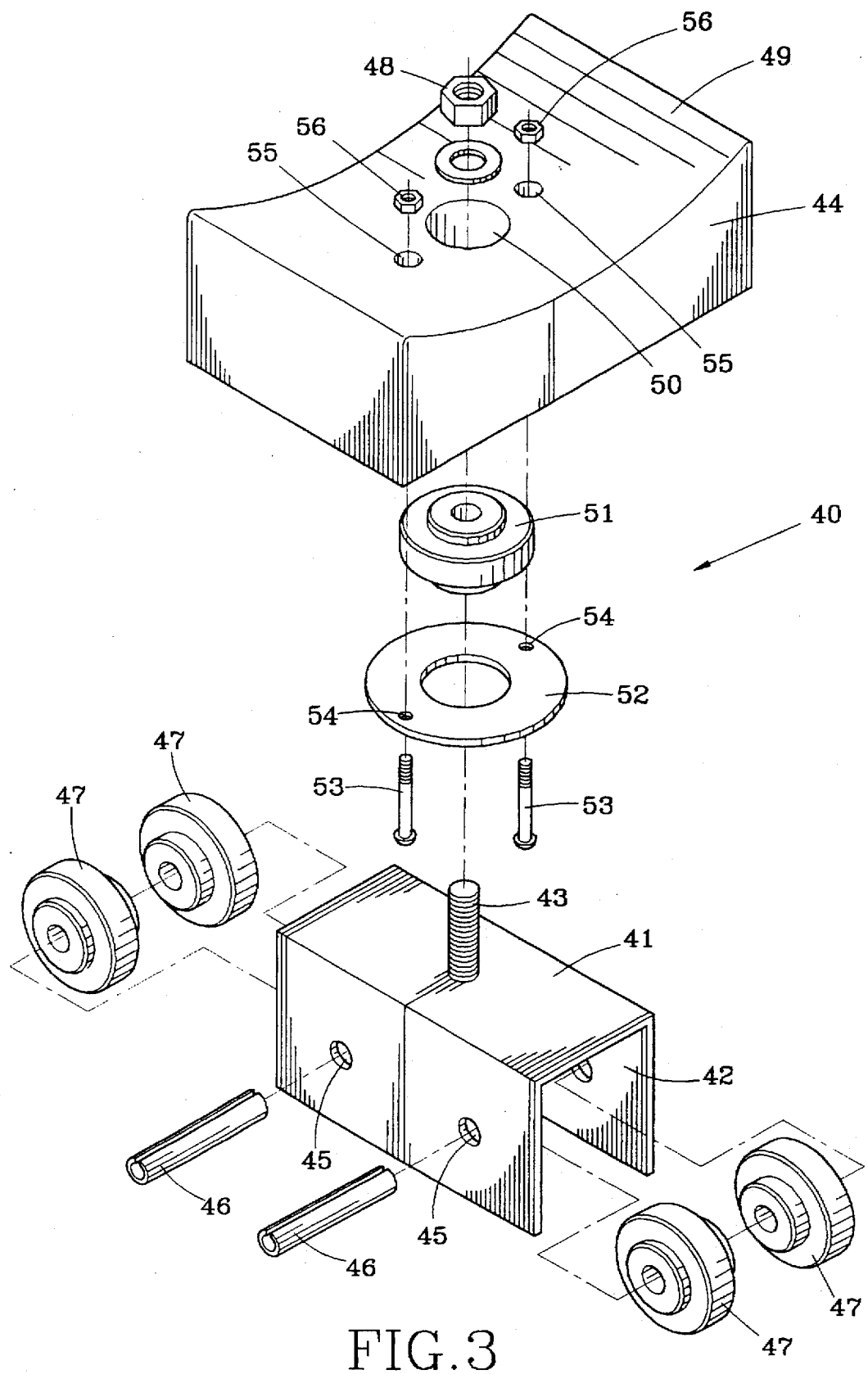
FIG. 3 is an exploded perspective view showing the sliding member and the arm rest adapted in the arm support of the present invention.

With reference to FIGS. 1 and 3, the slide member 40 comprises a slider 41 movably mounted on the swivelling member 30 on which the arm rest 44 is rotatably mounted.

Figure 5:
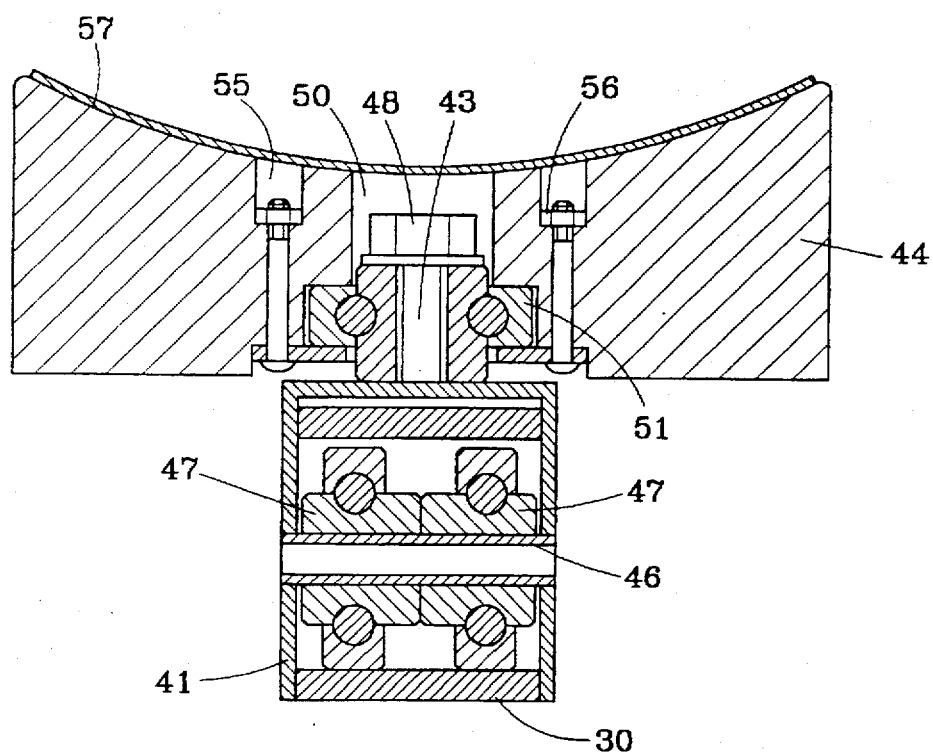
FIG. 5 is a cross sectional view showing the sliding member and arm rest.

Also referring to FIG. 5, the slider 41 is a hollow member defined by two opposite side walls connected by a top wall so as to form therein an interior space 42 having a front opening and an opposite rear opening, through which the strips of the swivelling member 30 is received.

A plurality of axles, preferably two, designated with reference numeral 46 are arranged to extending across the slider 41 via holes 45 formed on the side walls of the slider 41 to each rotatably support thereon a plurality of rollers 47. Preferably, each of the axles 46 has two rollers 47 associated therewith and preferably, the rollers 47 comprise bearings. The rollers 47 are located within the spacing 31 between the two strips of the swivelling member 30 and supported on the lower one of the strips so as to provide smooth movement of the slider along the strip of the swivelling member 30.

The arm rest 44 comprises a concave top face 49 for comfortably supporting thereon the user's arm. A hole 50 extends from the top face 49 to an opposite bottom face to rotatably receive therein a threaded rod 43 formed on the top wall of the slider 41 and extending upward therefrom. A bearing 51 is arranged within the hole 50 with the rod 43 extending therethrough to provide a more smooth rotation of the arm rest 44 with respect to the slider 41. A nut 48 is received within the hole 50 from the top face 49 of the arm rest 49 and engages the threaded rod 43 to secure the bearing 51 thereon.

A washer or ring member 52 is disposed under the bearing 51 and has a plurality of holes 54 formed thereon to receive bolts 53 to extend therethrough. The bolts 53 also extend into holes 55 formed through the arm rest 49 to be secured thereon with nuts 56. This secures the bearing 51 to the arm rest 44 so as to secure the arm rest 44 to the threaded rod 43 of the slider 41.

Preferably, an anti-slippery pad 57 is provided on the concave top face 49 of the arm rest 44.

In mounting the sliding member 40 to the anchoring member 10, the strips of the swivelling member 30 are first extended through the slider 41 of the sliding member 40 with the rollers 47 received within the spacing 31 thereof. The proximal ends of the strips of the swivelling member 30 are then received within the bore 12 of the anchoring member 10 through the lateral slits 13 and 14 to receive the pivot axle 17 to extend therethrough.

The arm support in accordance with the present invention is mounted to the desk 34 by fixing the desk 34 between the clip plate 21 and the flange plate 19 by means of the relative movement between the clip plate 21 and the flange plate 19.

The arm support so mounted to the desk 34 allows the swivelling member 30 to rotate about the pivot axle 17 in a horizontal plane under the normal condition that the desk top is substantially horizontal. The sliding member 40 is free to move along the swivelling arm 30 and the arm rest 44 is free to rotate about the rod 34 so that the arm rest 44 may be positioned at any desired location and orientation to support the arm of the computer operator. Further, such a configuration also allows a user to stow the arm support of the present invention in a very limited space.

The above description is made with respect to a preferred embodiment of the present invention and for those skilled in the art, it is possible to make modifications and changes to the above-described embodiment without departing from the scope and spirit of the present invention. All these modifications and changes should be considered within the scope of the present invention as defined in the appended claims.

What is claimed is:

1. An arm support adapted to support an arm of a user in a suspended manner, comprising:

anchoring means adapted to be mounted to a fixed plate;

swivelling means comprising an elongated member having a proximal end pivoted to the anchoring means and an opposite distal end defining a stop; and sliding means comprising a slider mounted on the elongated member to be movable between the anchoring means to which the proximal end is pivoted and the stop defined by the distal end of the elongated member and an arm rest rotatably mounted to the slider, defining a top face to support the arm of the user thereon, said anchoring means including an anchoring body adapted to be mounted to the fixed plate, the anchoring body comprising a bore and two lateral slits in communication with the bore and wherein the elongated member of the swivelling means comprises two strips each having a proximal end with a hole formed thereon, the proximal ends of the strips being movably fit into the slits to have the holes thereof received within the bore, a pivot axle received within the bore and extending through the holes of the strips so as to pivot the swivelling means to the anchoring means.

2. The arm support as claimed in claim 1, wherein the anchoring means comprises bearing means received within the bore and fit onto the pivot axle for providing a smooth rotation to the swivelling means relative to the anchoring means.

3. The arm support as claimed in claim 2, wherein the pivot axle comprises a bolt received within the bore and extending through both the holes of the strips of the swivelling means and the bearing means with a nut engaged thereon so as to secure the bearing means within the bore and to secure the swivelling means to the anchoring means.

4. The arm support as claimed in claim 1, wherein the anchoring body comprises a lid member to seal a top opening of the bore.

5. The arm support as claimed in claim 1, wherein the strips comprise distal ends, opposite to the proximal ends, the distal ends being connected to each other to define the stop.

6. The arm support as claimed in claim 1, wherein the slider comprises a hollow member having two opposite side walls and a top wall, defining therebetween an interior space with a front opening and an opposite rear end opening to receive the elongated member of the swivelling means to extend therethrough, the slider comprising a plurality of axles extending between the two side walls thereof to rotatably support thereon a plurality of rollers located within the interior space of the slider, the rollers being rollingly supported on the elongated member extending through the interior space of the slider so as to allow the slider to smoothly move along the elongated member of the swivelling means.

7. The arm support as claimed in claim 1, wherein the two strips of said elongated member are spaced from each other to define therebetween a spacing, each of the strips having a proximal end pivoted to the anchoring means and an opposite distal end connected to each other to define the stop, the slider includes a hollow member having two opposite side walls and a top wall, defining therebetween an interior space with a front opening and an opposite rear end opening to receive the strips of the elongated member of the swivelling means to extend therethrough, the slider comprising a plurality of axles extending between the two side walls thereof to rotatably support thereon a plurality of rollers located within the interior space of the slider, the rollers being arranged within the spacing defined between the two strips and rollingly supported on one of the strips extending through the interior space of the slider so as to allow the slider to smoothly move along the strip of the swivelling means.

8. The arm support as claimed in claim 1, wherein the arm rest has a hole extending from the top face thereof to an opposite bottom face and the slider includes a rod extending therefrom to be rotatably received within the hole of the arm rest so as to rotatably moment the arm rest to the slider, the rod extending from the slider being provided with threading and wherein the arm rest comprises a bearing received within the hole and fitted over the rod and retained thereon by a nut engaging the threading of the rod, a ring member disposed on an underside of the bearing and having holes formed thereon to receive bolts to extend therethrough, the bolts further extending through corresponding holes formed on the arm rest to be secured therein by means of nuts so as to secure the arm rest to the slider.

* * * * *